United States Patent [19]

Makino et al.

[11] Patent Number: 5,019,474

[45] Date of Patent: May 28, 1991

[54] ELECTROPHOTOGRAPHIC PHOTORECEPTOR

[75] Inventors: Naonori Makino; Shigeru Ohno; Satoshi Hoshi; Katsuji Kitatani, all of Kanagawa, Japan

[73] Assignee: Fuji Photo Film Co., Ltd., Kanagawa, Japan

[21] Appl. No.: 504,205

[22] Filed: Apr. 4, 1990

[30] Foreign Application Priority Data

Apr. 5, 1989 [JP] Japan .................................. 1-86589

[51] Int. Cl.$^5$ .............................................. G03G 5/06
[52] U.S. Cl. ...................................... 430/76; 430/58; 430/77; 430/78
[58] Field of Search ...................... 430/72, 73, 76, 77, 430/78, 58

[56] References Cited

U.S. PATENT DOCUMENTS 4,865,935 9/1989 Ueda ..................................... 430/77

FOREIGN PATENT DOCUMENTS 3804421 8/1988 Fed. Rep. of Germany .

OTHER PUBLICATIONS

Patent Abstracts of Japan, vol. 11, No. 233 entitled "Photosensitive Composition," dated Jul. 30, 1987.
Patent Abstracts of Japan, vol. 9, No. 259 entitled "Photosensitive Body," dated Oct. 17, 1985.

Primary Examiner—John Goodrow
Attorney, Agent, or Firm—Sughrue, Mion, Zinn Macpeak & Seas

[57] ABSTRACT

A novel electrophotographic photoreceptor is provided comprising on an electrically conductive support a layer containing a charge-transporting compound and a charge-generating compound or a charge-transporting compound-containing layer and a charge-generating compound-containing layer, characterized in that as said electric charge-generating compound there is contained a tetrakisazo compound represented by the general formula (1):

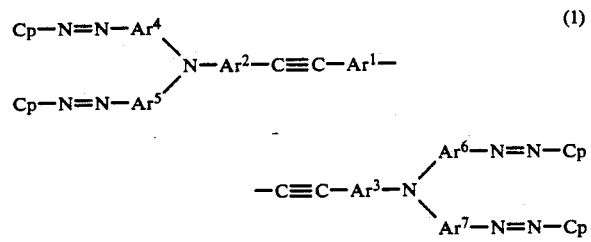

wherein $Ar^1$, $Ar^2$, $Ar^3$, $Ar^4$, $Ar^5$, $Ar^6$ and $Ar^7$ each represents an arylene group, divalent condensed polycyclic aromatic group or divalent heterocyclic aromatic group; and Cp represents a coupler residue.

10 Claims, No Drawings

ELECTROPHOTOGRAPHIC PHOTORECEPTOR

FIELD OF THE INVENTION

The present invention relates to an electrophotographic photoreceptor comprising an electrophotographic light-sensitive layer containing a novel tetrakisazo compound.

BACKGROUND OF THE INVENTION

As photoconductive compositions to be incorporated in electrophotographic photoreceptors there have heretofore been well known inorganic substances such as selenium, cadmium sulfide, zinc oxide and amorphous silicon. These inorganic substances are advantageous in that they have excellent electrophotographic properties. In particular, these inorganic substances exhibit an extremely excellent photoconductivity, charge acceptability in a dark place and insulating properties. On the other hand, however, these inorganic substances have various disadvantages. For example, selenium photoreceptors are expensive to manufacture, have no flexibility and cannot withstand thermal or mechanical shock. Cadmium sulfide photoreceptors can cause a pollution problem because cadmium is a toxic substance. Zinc oxide is disadvantageous in that it exhibits a poor image stability after repeated use. Furthermore, amorphous silicon photoreceptors are extremely expensive to manufacture and also require a special surface treatment to prevent surface deterioration thereof.

In recent years, electrophotographic photoreceptors comprising various organic substances have been proposed and some of them have been put into practical use to eliminate the disadvantages of inorganic substances. Examples of these approaches include electrophotographic photoreceptors comprising poly-N-vinylcarbazole and 2,4,7-trinitrofluorenone-9-one as disclosed in U.S. Pat. No. 3,484,237, electrophotographic photoreceptors comprising poly-N-vinylcarbazole sensitized with a pyrilium salt dye as disclosed in JP-B-48-25658 (the term "JP-B" as used herein means an "examined Japanese patent publication"), and electrophotographic photoreceptors comprising as a main component an eutectic complex of a dye and a resin as disclosed in JP-A-47-10375 (the term "JP-A" as used herein means an "unexamined published Japanese patent application").

Furthermore, many active studies and proposals have recently been made on electrophotographic photoreceptors comprising as main components organic pigments such as perylene pigment (as described in U.S. Pat. No. 3,371,884), phthalocyanine pigment (as described in U.S. Pat. Nos. 3,397,086 and 4,666,802), azulenium salt pigment (as described in JP-A-59-53850 and JP-A-61-212542), squalium salt pigment (as described in U.S. Pat. Nos. 4,396,610 and 4,644,082) and polycyclic quinone pigment (as described in JP-A-59-184348 and JP-A-62-28738) or the following azo pigments:

Bisazo pigments as disclosed in JP-A-47-37543, JP-A-56-116039, JP-A-58-123541, JP-A-61-260250, JP-A-61-228453, JP-A-61-275849 and JP-A-61-275850, and JP-B-60-5941 and JP-A-60-45664;

Trisazo pigments as disclosed in U.S. Pat. Nos. 4,436,800 and 4,439,506, and JP-A-53-132347, JP-A-55-69148, JP-A-57-195767, JP-A-57-200045, JP-A-57-204556, JP-A-58-31340, JP-A-58-31341, JP-A-58-154560, JP-A-58-160358, JP-A-58-160359, JP-A-59-127044, JP-A-59-196366, JP-A-59-204046, JP-A-59-204841, JP-A-59-218454, JP-A-60-111249, JP-A-60-111250, JP-A-61-11754, JP-A-61-22346, JP-A-61-35451, JP-A-61-67865, JP-A-61-121059, JP-A-61-163969, JP-A-61 179746, JP-A-61-230157, JP-A-61-251862, JP-A-61-251865, JP-A-61-269164, JP-A-62-21157, JP-A-62-78563 and JP-A-62-115452; and Tetrakisazo pigments as disclosed in U.S. Pat. Nos. 4,447,513, and JP-A-60-108857, JP-A-60-108858, JP-A-60-111247, JP-A-60-111248, JP-A-60-118843, JP-A-60-176046, JP-A-61-103157, JP-A-61-117559, JP-A-61-182051, JP-A-61-194447, JP-A-61-196253, JP-A-61-212848, JP-A-61-240246, JP-A-61-273548, JP-A-61-284769, JP-A-62-18565, JP-A-62-18566 and JP-A-62-19875.

These electrophotographic photoreceptors can attain some improvement in the mechanical properties and flexibility of the above described inorganic electrophotographic photoreceptors. However, these electrophotographic photoreceptors leave to be desired in sensitivity. These electrophotographic photoreceptors are also disadvantageous in that they may exhibit some change in the electrical properties upon repeated use. Thus, these electrophotographic photoreceptors do not necessarily satisfy the requirements for electrophotographic photoreceptors.

SUMMARY OF THE INVENTION

It is therefore an object of the present invention to provide a novel electrophotographic photoreceptor which exhibits a high sensitivity and durability.

It is another object of the present invention to provide a novel electrophotographic photoreceptor which exhibits a small change in the light-sensitivity upon repeated use.

The above and other objects of the invention will become more apparent from the following detailed description and examples.

These objects of the present invention are accomplished with an electrophotographic photoreceptor comprising on an electrically conductive support a layer containing a charge-transporting compound and a charge-generating compound or a charge-tranasporting compound-containing layer and a charge-generating compound-containing layer, characterized in that as said charge-generating compound there is contained a tetrakisazo compound represented by the general formula (1):

$$Cp-N=N-Ar^4 \diagdown N-Ar^2-C\equiv C-Ar^1- \atop Cp-N=N-Ar^5 \diagup$$

(1)

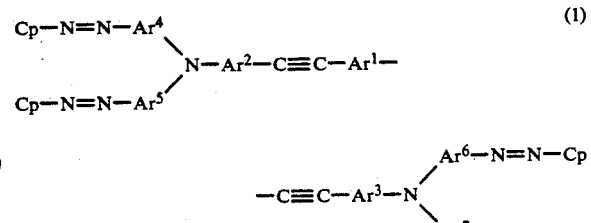

wherein $Ar^1$, $AR^2$, $AR^3$, $Ar^4$, $Ar^5$, $AR^6$ and $Ar^7$ each represents an arylene group, divalent condensed polycyclic aromatic group or divalent heterocyclic aromatic group; and Cp represents a coupler residue.

DETAILED DESCRIPTION OF THE INVENTION

The tetrakisazo compound represented by the general formula (1) will be further illustrated hereafter.

Examples of the group represented by $Ar^1$, $Ar^2$, $Ar^3$, $Ar^4$, $Ar^5$, $Ar^6$ and $Ar^7$ include a $C_{6-18}$ arylene groups such as phenylene, naphthalene, antolylene, biphenylene and terphenylene, divalent groups derived from a condensed polycyclic aromatic group (preferably having 9 to 18 carbon atoms), such as indene, fluorene, acenaphthene, perylene, fluorenone, anthrone, anthraquinone, benzoanthrone and isocoumarin, and divalent groups derived from a heterocyclic aromatic group, such as pyridine, quinoline, oxazole, thiazole, oxadiazole, benzooxazole, benzoimidazole, benzothiazole, benzotriazole, dibenzofurane, carbazole, and xanthene. Preferably, the heterocyclic group contains 4 to 12 carbon atoms and contains 1 to 6 hetero atoms (e.g., nitrogen, oxygen, sulfur).

If $Ar^1$, $Ar^2$, $Ar^3$, $Ar^4$, $Ar^5$, $Ar^6$ and $Ar^7$ each contains substituents, examples of such substituents include an $C_{1-18}$ alkyl group, $C_{1-18}$ alkoxy group, dialkylamino group containing two $C_{1-18}$ alkyl groups, $C_{1-18}$ acyl group, $C_{1-18}$ acyloxy group, $C_{1-18}$ amido group, $C_{6-15}$ aryl group, $C_{6-15}$ aryloxy group, halogen atom, hydroxy group, carboxyl group, nitro group, cyano group, and trifluoromethyl group.

Cp represents:

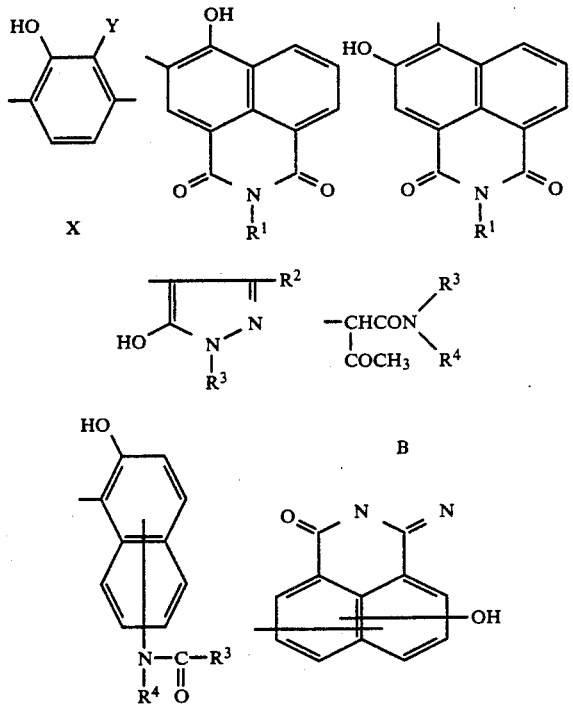

wherein X represents an atomic group which is required to be condensed with the benzene ring to which a hydroxy group and Y are bonded to form an aromatic group such as a naphthalene ring and anthracene ring or a heterocyclic group such as an indole ring, carbazole ring, benzocarbazole ring and dibenzofurane ring.

If X is an aromatic group or heterocyclic group containing substituents, examples of such substituents include a halogen atom (e.g., fluorine, chlorine, bromine), $C_{1-18}$ alkyl group (e.g., methyl, ethyl, propyl, butyl, dodecyl, octadecyl, isopropyl, isobutyl), trifluoromethyl group, nitro group, amino group, cyano group, and $C_{1-18}$ alkoxy group (e.g., methoxy ethoxy, butoxy). Any number of such substituents may be placed on any positions.

Y represents $-CONR^3R^4$, $-CONHN=CR^3R^4$ or $-COOR^3$.

$R^1$ represents a substituted or unsubstituted $C_{1-12}$ alkyl or a substituted or unsubstituted $C_{6-14}$ aryl group.

If $R^1$ is an unsubstituted alkyl group, specific examples of such an unsubstituted alkyl group include a methyl group, ethyl group, propyl group, butyl group, pentyl group, hexyl group, isopropyl group, isobutyl group, isoamyl group, isohexyl group, neopentyl group, and tert-butyl group.

If $R^1$ is a substituted alkyl group, examples of substituents which can be contained in such a substituted alkyl group include a hydroxy group, $C_{1-12}$ alkoxy group, cyano group, amino group, $C_{1-12}$ alkylamino group, dialkylamino group containing two $C_{1-12}$ alkyl groups, halogen atom, and $C_{6-15}$ aryl group. Specific examples of such substituted alkyl groups include a hydroxyalkyl group (e.g., hydroxymethyl, 2-hydroxyethyl, 3-hydroxypropyl, 2-hydroxypropyl), alkoxyalkyl group (e.g., methoxymethyl, 2-methoxyethyl, 3-methoxypropyl, ethoxymethyl, 2-ethoxyethyl), cyanoalkyl group (e.g., cyanomethyl, 2-cyanoethyl), aminoalkyl group (e.g., aminomethyl, 2-aminoethyl, 3-aminopropyl), (alkylamino)alkyl group (e.g., (methylamino)methyl, 2-(methylamino)ethyl, (ethylamino)methyl), (dialkyl(-dimethylamino)ethyl), halogenalkyl group (e.g., fluoromethyl, trifluoromethyl, chloromethyl), and aralkyl group (e.g., benzyl, phenethyl).

If $R^1$ is an unsubstituted aryl group, specific examples of such an unsubstituted aryl group include a phenyl group, naphthyl group, and anthryl group.

If $R^1$ is a substituted aryl group, examples of substituents for the aryl group include a hydroxy group, $C_{1-12}$ alkoxy group, cyano group, amino group, $C_{1-12}$ alkylamino qroup, dialkylamino group oontaininq two $C_{1-12}$ alkyl groups, halogen atom, $C_{1-12}$ alkyl group, nitro group, and trifluoromethyl group. Specific examples of such substituted aryl groups include a hydroxyphenyl group, alkoxyphenyl group (e.g., methoxyphenyl, ethoxyphenyl), cyanophenyl group, aminophenyl group, (alkylamino)phenyl group (e.g., (methylamino)phenyl, (ethylamino) phenyl, (dialkylamino)pheny 1), (dialkylamino)phenyl group (e.g., (dimethylamino)phenyl, (diethylamino)phenyl), halogenophenyl group (e.g., fluorophenyl, chlorophenyl, bromophenyl), alkylphenyl group (e.g., tolyl, ethylphenyl, cumenyl, xylyl, mesityl), nitrophenyl group, trifluoromethylphenyl group, and phenyl group containing two or three such substituents which may be the same or different. The position on which these substituents are placed is arbitrary.

$R^2$ represents an alkyl group, carbamoyl group, carboxyl group, alkoxycarbonyl group, aryloxycarbonyl group, or a substituted or unsubstituted amino group.

Preferred examples of the group represented by $R^2$ include a $C_{1-6}$ lower alkyl group, carbamoyl group, carboxyl group, alkoxycarbonyl group containing $C_{1-12}$ alkoxy groups, aryloxycarbonyl group containing $C_{6-20}$ aryloxy groups, and substituted or unsubstituted amino group.

If $R^2$ is a substituted amino group, specific examples of such a substituted amino group include a methylamino group, ethylamino group, propylamino group, phenylamino group, tolylamino group, benzylamino group, diethylamino group, and diphenylamino group.

If $R^2$ is a lower alkyl group, specific examples of such a lower alkyl group include a methyl group, ethyl group, propyl group, butyl group, isopropyl group, and isobutyl group.

If $R^2$ is an alkoxycarbonyl group, specific examples of such an alkoxycarbonyl group include a methoxycarbonyl group, ethoxycarbonyl group, propoxycarbonyl group, butoxycarbonyl group, isopropoxycarbonyl group, and benzyloxycarbonyl group.

If $R^2$ is an aryloxycarbonyl group, specific examples of such an aryloxycarbonyl group include a phenoxycarbonyl group, and trioxycarbonyl group.

$R^3$ is an alkyl group, aromatic carbon ring group, or a heterocyclic group, each of which may be substituted. Preferred examples of the group represented by $R^3$ include a $C_{1-20}$ alkyl group, aromatic carbon ring group (preferably which contain 6 to 14 carbon atoms) such as phenyl group and naphthyl group, aromatic heterocyclic group such as dibenzofuranyl group, carbazolyl group and dibenzocarbazolyl group, and substituted groups thereof. Preferably the heterocyclic group contains 4 to 12 carbon atoms and contains 1 to 6 hetero atoms (e.g., nitrogen, oxygen, sulfur).

If $R^3$ is a substituted or unsubstituted alkyl group, specific examples of such a substituted or unsubstituted alkyl group include those described with reference to $R^1$.

If $R^3$ is an aromatic carbon ring group containing a substituent or an aromatic heterocyclic group containing a substituent, specific examples of such substituents include a hydroxy group, cyano group, nitro group, halogen atom (e.g., fluorine, chlorine, bromine), $C_{1-12}$ alkyl group (e.g., methyl, ethyl, propyl, isopropyl), $C_{1-12}$ alkoxy group (e.g., methoxy, ethoxy, propoxy, butoxy, pentyloxy, isopropoxy, isobutoxy, isoamyloxy, tert-butoxy, neopentyloxy), amino group, $C_{1-12}$ alkylamino group (e.g., methylamino, ethylamino, propylamino), $C_{1-12}$ dialkylamino group (e.g., dimethylamino, diethylamino, N-methyl-N-ethylamino), $C_{6-12}$ arylamino group (e.g., phenylamino, tolylamino), diarylamino group containing two $C_{6-15}$ aryl groups (e.g., diphenylamino), carboxyl group, alkaline metal carboxylate group (examples of alkaline metal cations include $Na\oplus$, $K\oplus$ $Li\oplus$), alkaline metal sulfonate group (examples of alkaline metal cations include $Na\oplus$, $K\oplus$, $Li\oplus$), alkylcarbonyl group (e.g., acetyl, propionyl benzylcarbonyl), arylcarbonyl group containing $C_{6-12}$ aryl groups (e.g., benzoyl, toluoyl), $C_{1-12}$ alkylthio group (e.g., methylthio, ethylthio), and $C_{1-12}$ arylthio group (e.g., phenylthio, tolylthio). The number of these substituents which can be contained in the substituted aromatic carbon ring group is in the range of 1 to 5. If a plurality of these substituents are contained in the substituted aromatic carbon ring group, they may be the same or different. The position on which these substituents can be placed is arbitrary.

$R^4$ represents a hydrogen atom or has the same meaning as $R^3$.

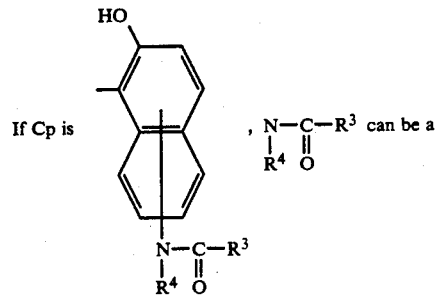

substituent on carbon atom at any of the 3- to 8-positions, preferably 8-position, of the naphthalene ring.

B represents a divalent aromatic hydrocarbon group (preferably which contains 6 to 14 carbon atoms) or divalent heteroyclic group containing one or more nitrogen atoms which may be substituted by an alkyl group, halogen atom, nitro group, trifluoromethyl group, cyano group or hydroxy group. Preferably, the heterocyclic group contains 6 to 14 carbon atoms and contains 1 to 6 hetero atoms. Examples of such a divalent aromatic hydrocarbon group include o-phenylene group, o-naphthylene group, peri-naphthylene group, 1,2-anthraquinolylene group, and 9,10-phenantrylene group. Examples of such a divalent heterocyclic group containing nitrogen atoms include 3,4-pyrazoledilyl group, 2,3-pyridiil group, 4,5-pyrimidinediil group, 6,7-indazolediil group, 5,6-benzimidazolediil group, and 6,7-quinolinediil group.

Specific examples of tetrakisazo compounds of the present invention will be set forth below, but the present invention should not be construed as being limited thereto. In the following tetrakisazo compound group, Cp' represents a coupler residue as shown in Tables 1, 2 and 3.

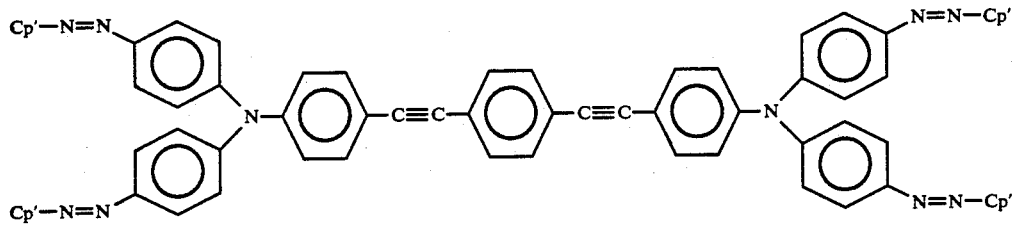

(1)

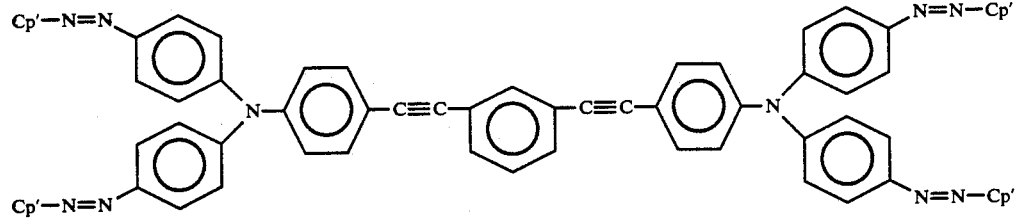

(2)

-continued
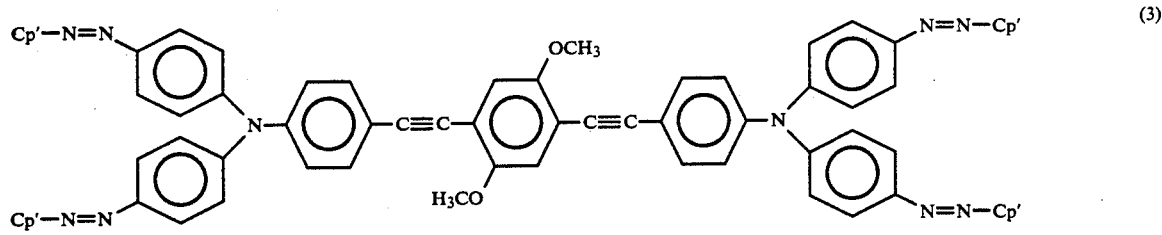
(3)
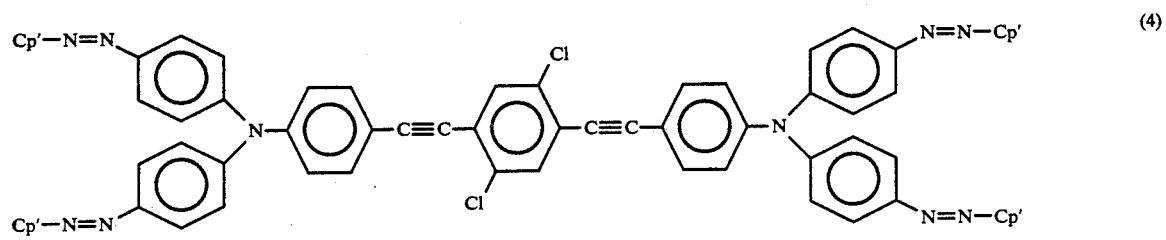
(4)
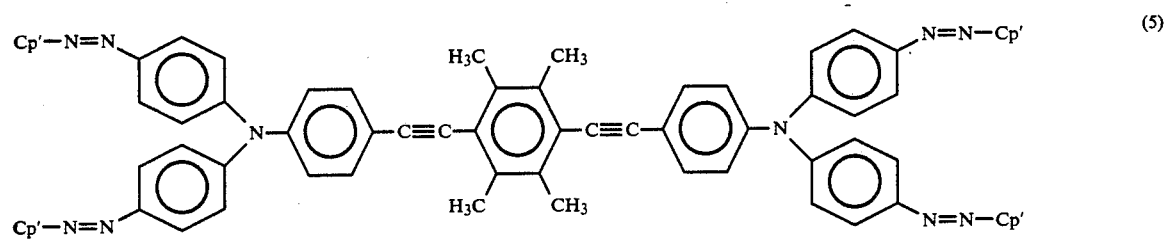
(5)
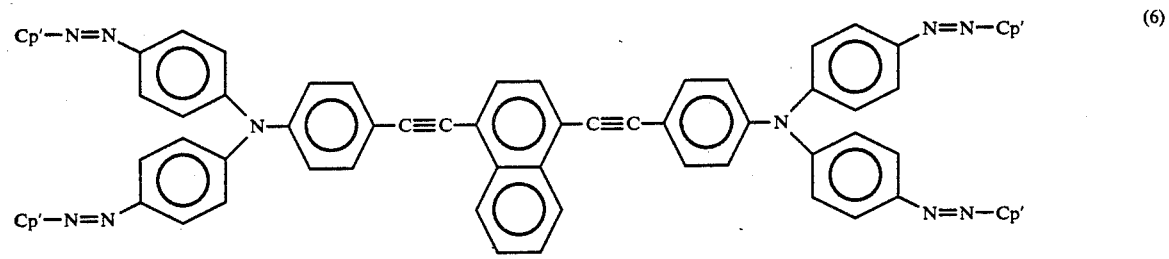
(6)
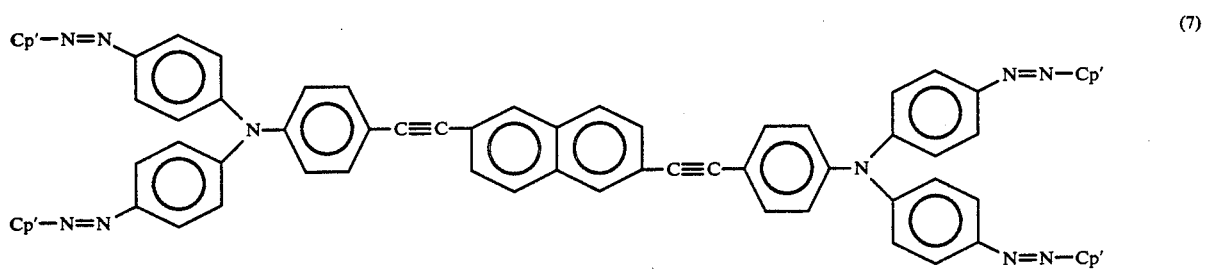
(7)
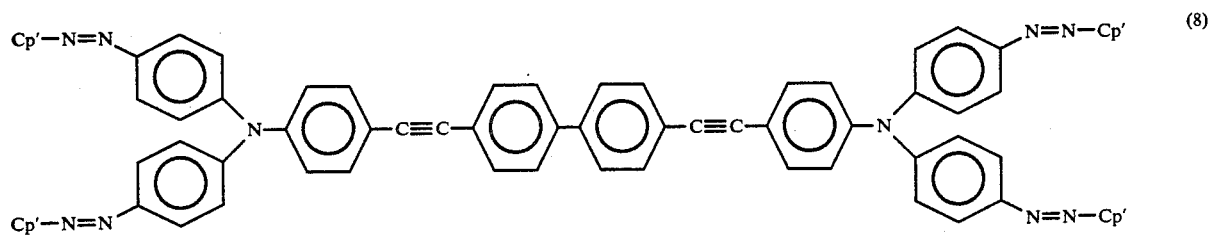
(8)

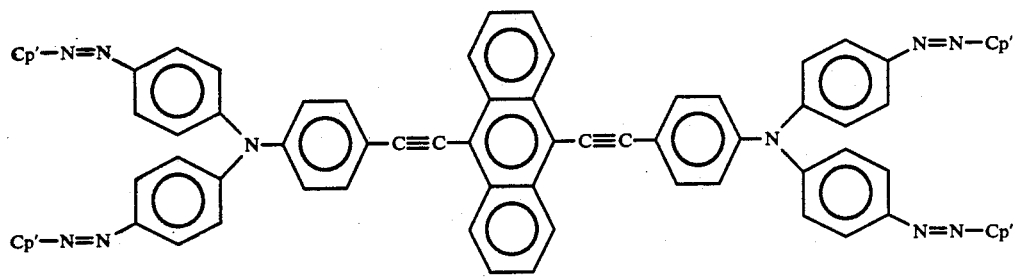
(9)
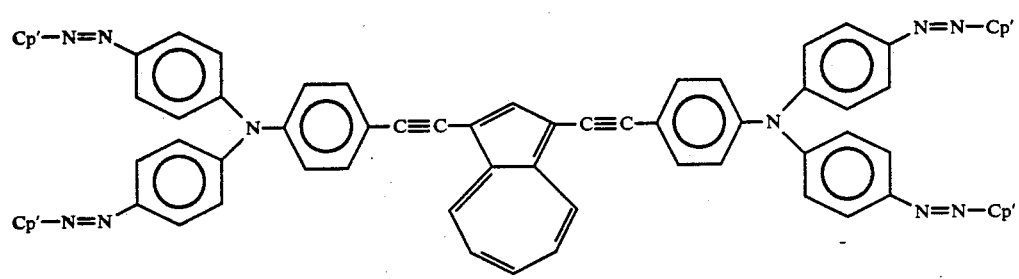
(10)
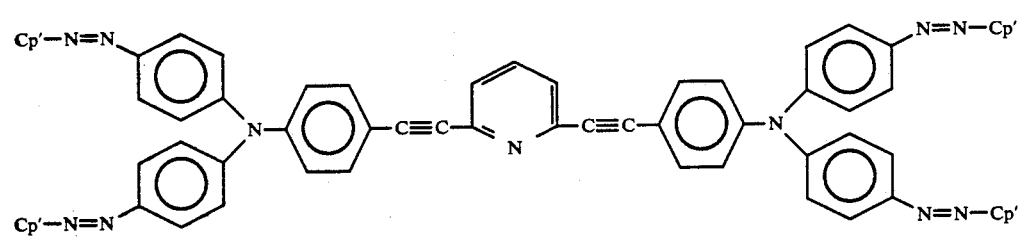
(11)
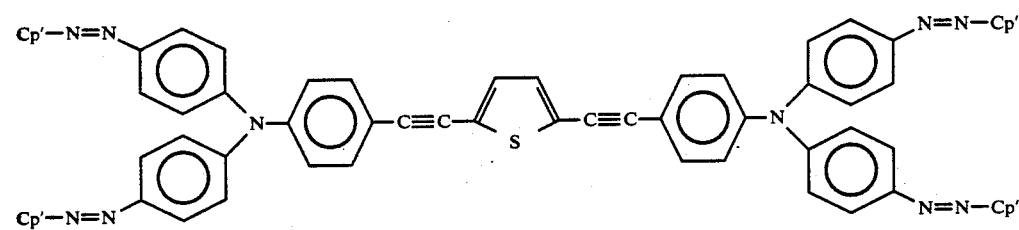
(12)
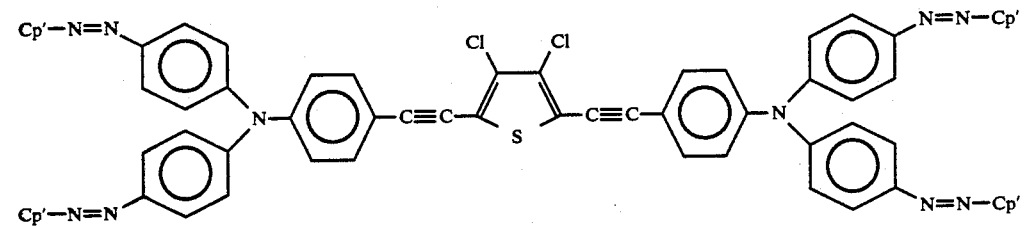
(13)
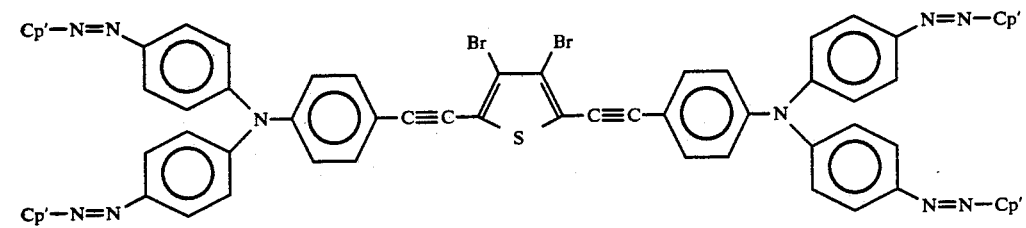
(14)

-continued
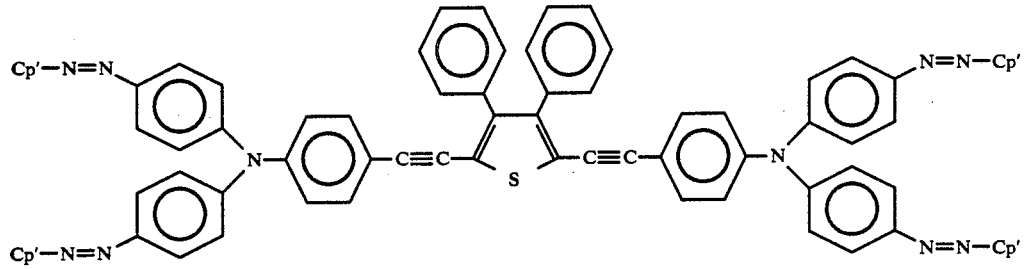
(15)
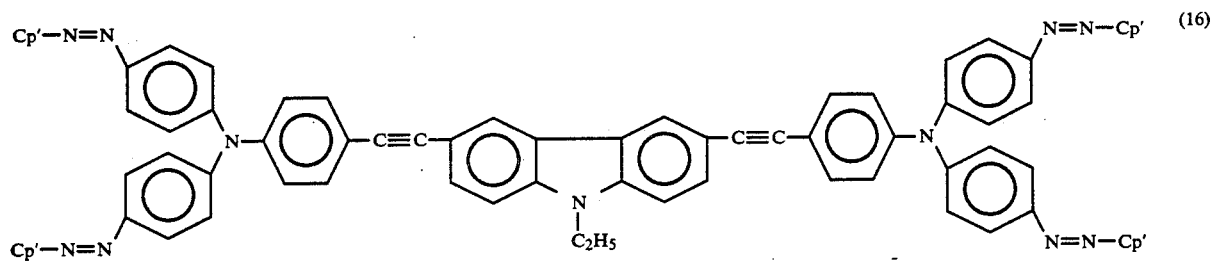
(16)
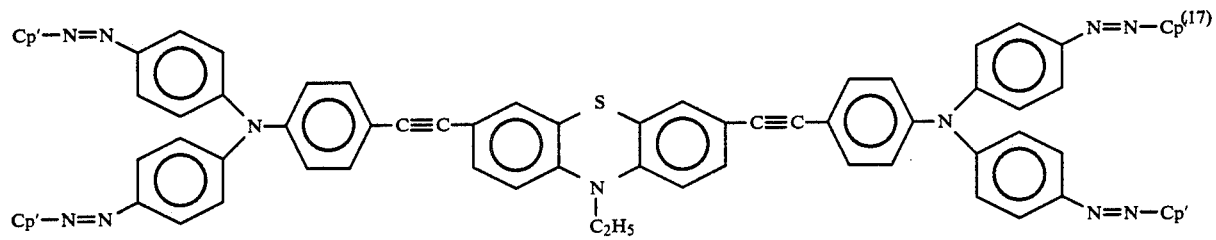
(17)
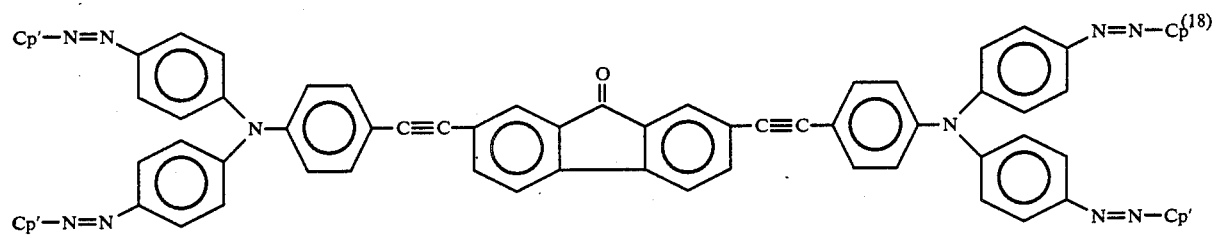
(18)
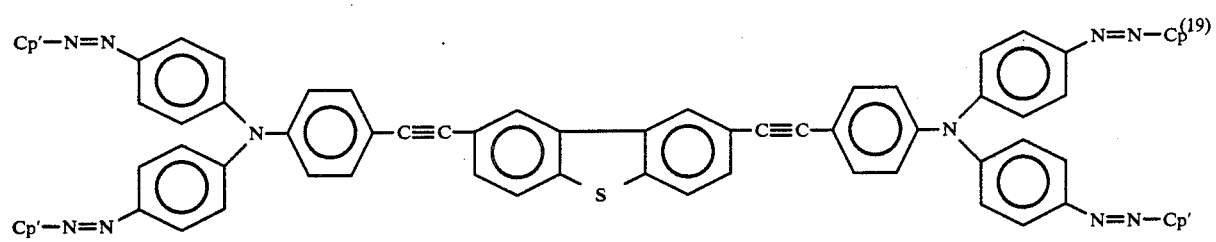
(19)
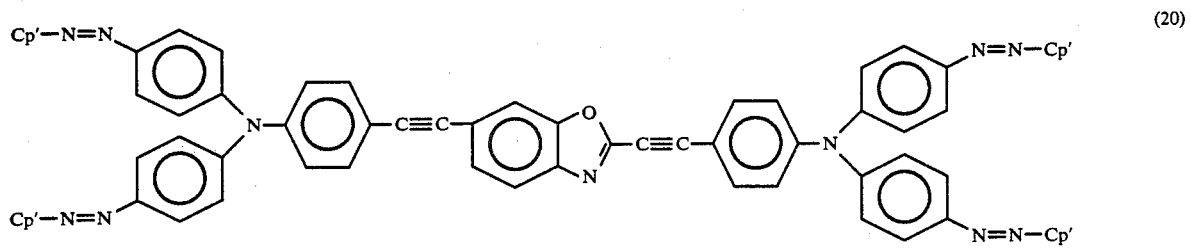
(20)

-continued
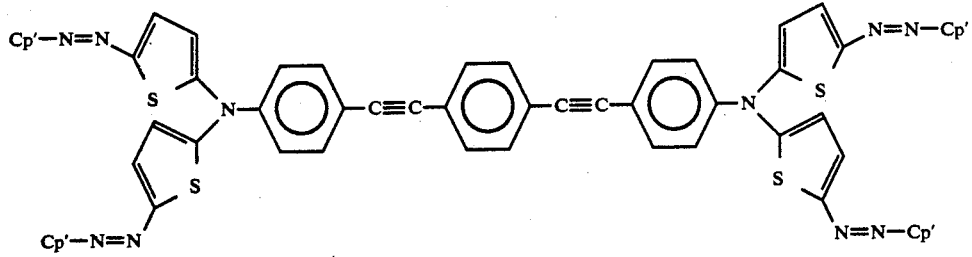
(21)
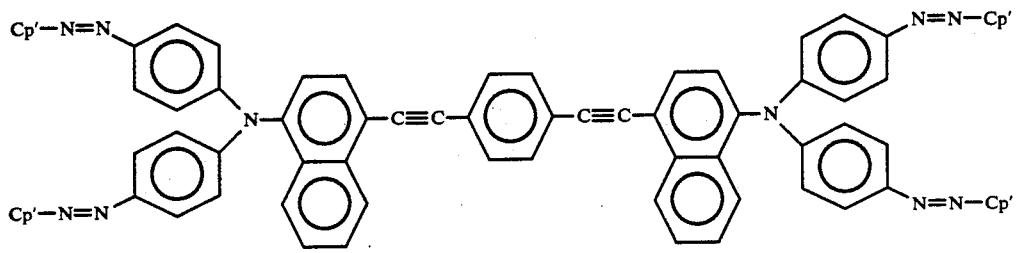
(22)
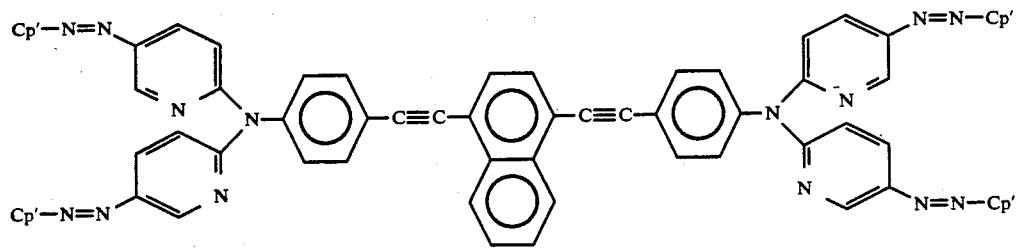
(23)
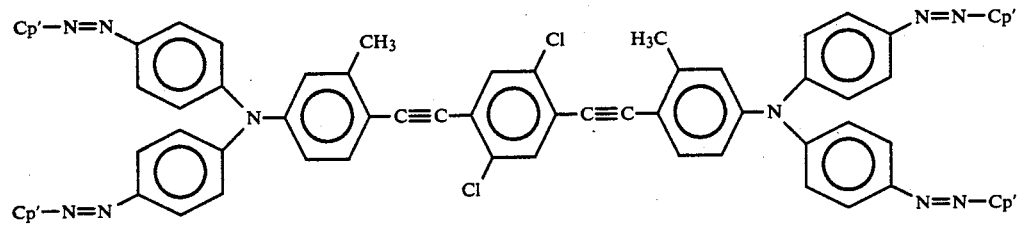
(24)
| TABLE 1 | | TABLE 1-continued | |
|---|---|---|---|
| No. of Cp' | Cp' | No. of Cp' | Cp' |
| (Cp'-1) | 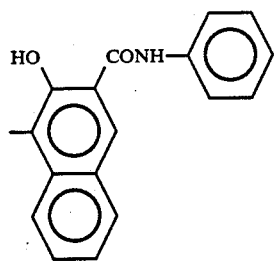 | (Cp'-3) | 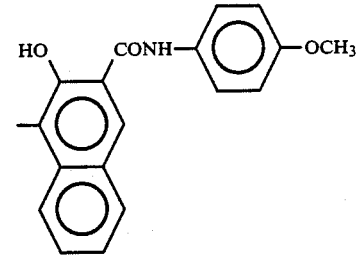 |
| (Cp'-2) | 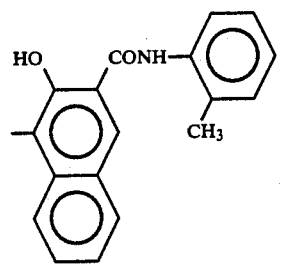 | (Cp'-4) | 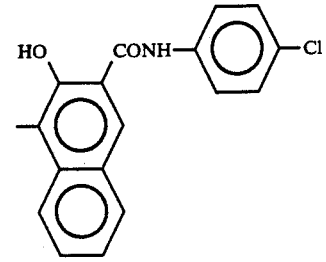 |

TABLE 1-continued
| No. of Cp' | Cp' |
|---|---|
| (Cp'-5) | 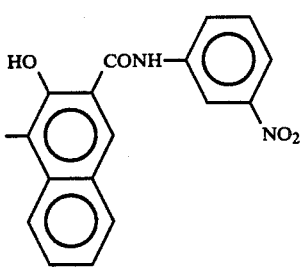 |
| (Cp'-6) | 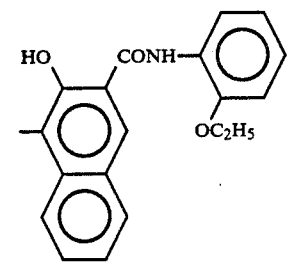 |
| (Cp'-7) | 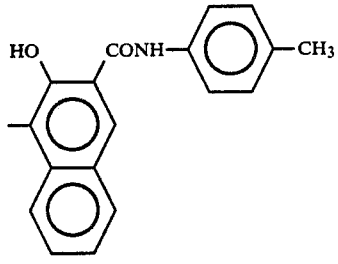 |
| (Cp'-8) | 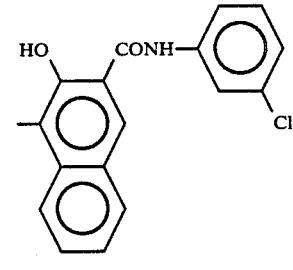 |
| (Cp'-9) | 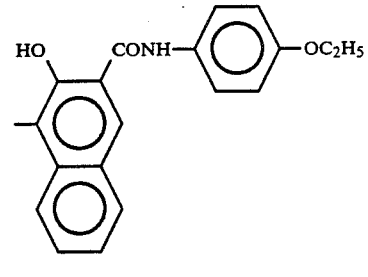 |
| (Cp'-10) | 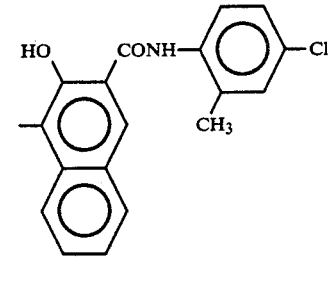 |
| (Cp'-11) | 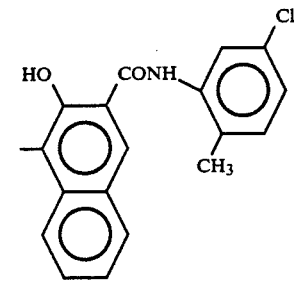 |
| (Cp'-12) | 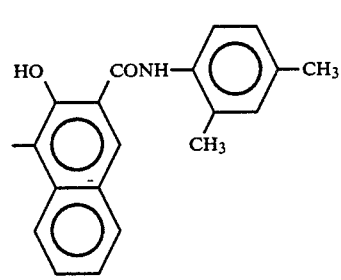 |
| (Cp'-13) | 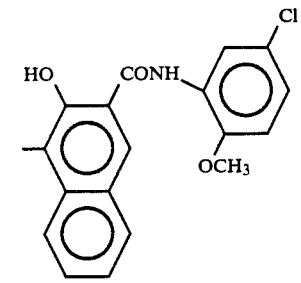 |
| (Cp'-14) | 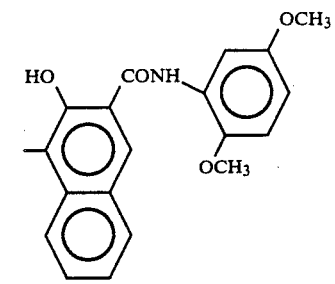 |
| (Cp'-15) | 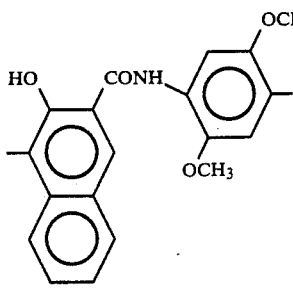 |

TABLE 1-continued
| No. of Cp' | Cp' |
|---|---|
| (Cp'-16) | 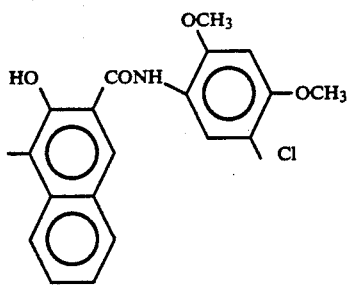 |
| (Cp'-17) | 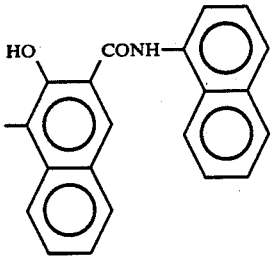 |
| (Cp'-18) | 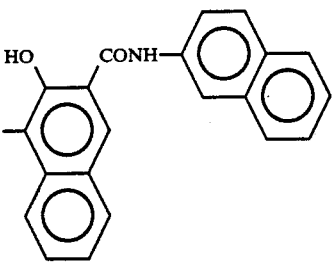 |
| (Cp'-19) | 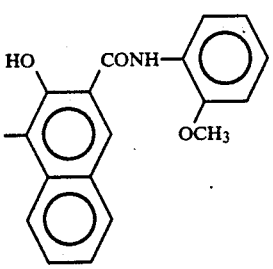 |
| (Cp'-20) | 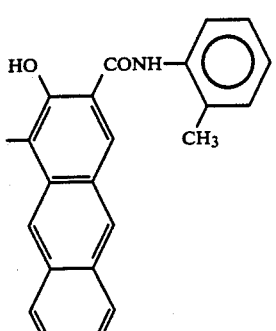 |
| (Cp'-21) | 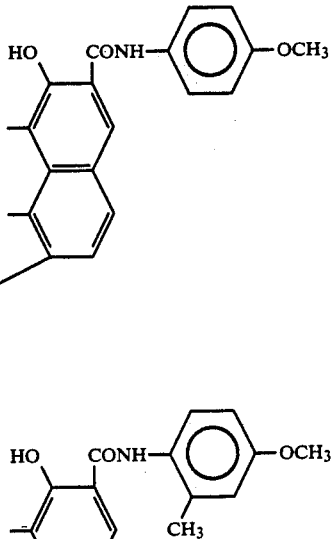 |
| (Cp'-22) | 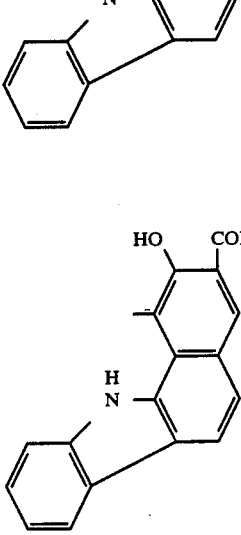 |
| (Cp'-23) | 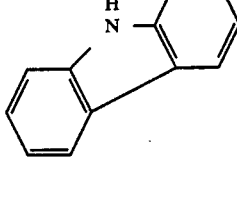 |
| (Cp'-24) | 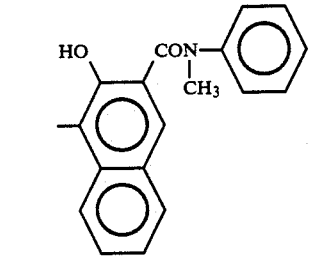 |
| (Cp'-25) | 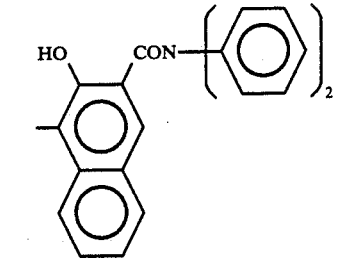 |

TABLE 1-continued

| No. of Cp' | Cp' |
|---|---|
| (Cp'-26) | 3-methyl-4-hydroxy-N-(4-chlorophenyl)-1,8-naphthalimide |
| (Cp'-27) | 3-methyl-4-hydroxy-N-methyl-1,8-naphthalimide |
| (Cp'-28) | 3-methyl-4-hydroxy-N-ethyl-1,8-naphthalimide |
| (Cp'-29) | 3-methyl-4-hydroxy-N-phenyl-1,8-naphthalimide |
| (Cp'-30) | 3-methyl-4-hydroxy-N-benzyl-1,8-naphthalimide |
| (Cp'-31) | N-(2-hydroxy-1-methylnaphthyl)benzamide |
| (Cp'-32) | N-(2-hydroxy-1-methylnaphthyl)-4-chlorobenzamide |
| (Cp'-33) | 1-phenyl-3-methyl-4-methyl-5-hydroxypyrazole |
| (Cp'-34) | 1-(4-chlorophenyl)-3-methyl-4-methyl-5-hydroxypyrazole |
| (Cp'-35) | —CH(COCH$_3$)CONH—C$_6$H$_5$ |
| (Cp'-36) | —CH(COCH$_3$)CONH—(2-naphthyl) |

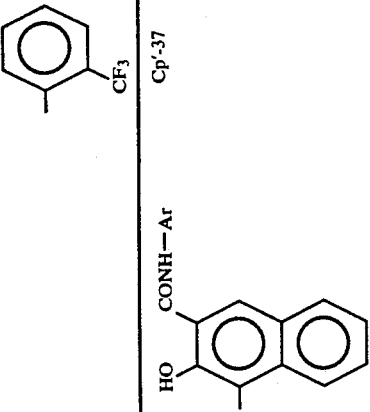

TABLE 2-continued

TABLE 2-continued
| Cp'-56 | Cp'-57 | Cp'-58 | Cp'-59 | Cp'-60 |
|---|---|---|---|---|
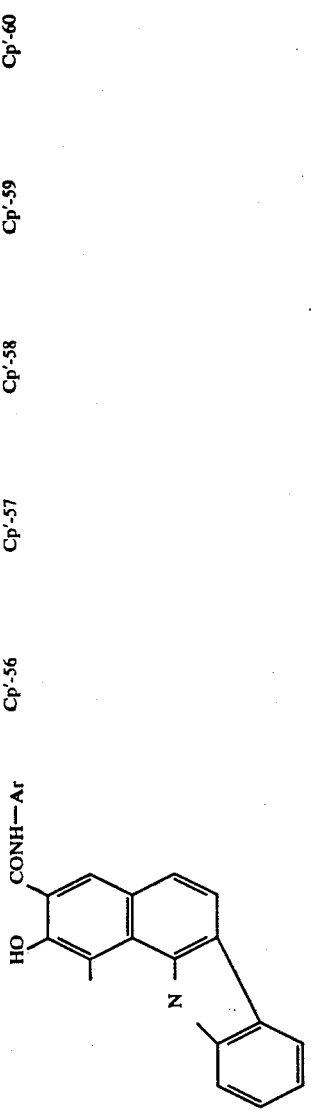
| Cp'-68 | Cp'-69 | Cp'-70 | Cp'-71 | Cp'-72 |
|---|---|---|---|---|
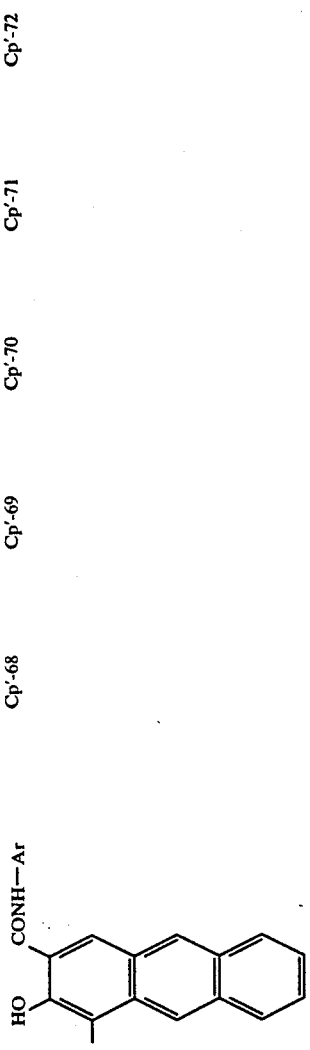
| Cp'-80 | Cp'-81 | Cp'-82 | Cp'-83 | Cp'-84 |
|---|---|---|---|---|
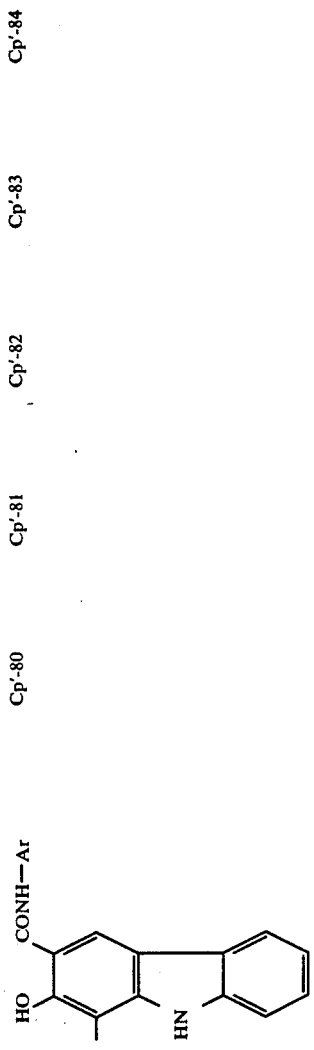

TABLE 2-continued

| | Cp'-92 | Cp'-93 | Cp'-94 | Cp'-95 | Cp'-96 |
|---|---|---|---|---|---|

Structure: 2-hydroxy-1-methyl-dibenzofuran-3-carboxamide (HO, CONH—Ar, CH₃ on dibenzofuran)

| Ar | | | | | | |
|---|---|---|---|---|---|---|
| | 3-C₂F₅-phenyl | 3-C₃F₇-phenyl | 4-C₆F₁₃-phenyl | 3,5-bis(CF₃)-phenyl | 4-NO₂-2-CF₃-phenyl | 4-OCH₃-2-CF₃-phenyl | 4-NEt₂-2-CF₃-phenyl |
| | Cp-97 | Cp-98 | Cp-99 | Cp-100 | Cp-101 | Cp-102 | Cp-103 |

| Cp-109 | Cp-110 | Cp-111 | Cp-112 | Cp-113 | Cp-114 | Cp-115 |
|---|---|---|---|---|---|---|

Structures: 3-hydroxy-4-methyl-2-naphthamide (HO, CONH—Ar on naphthalene with CH₃); and methyl-hydroxy-naphthamide with phenyl-N substituent.

TABLE 2-continued
| | Cp-121 | Cp-122 | Cp-123 | Cp-124 | Cp-125 | Cp-126 | Cp-127 |
|---|---|---|---|---|---|---|---|
| 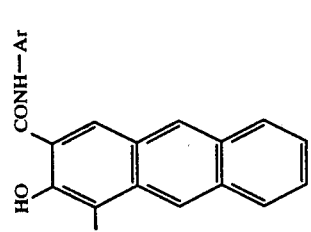 | | | | | | | |
| 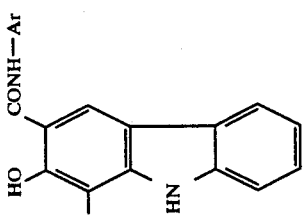 | Cp-133 | Cp-134 | Cp-135 | Cp-136 | Cp-137 | Cp-138 | Cp-139 |
| 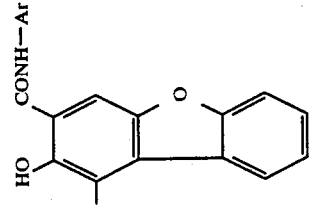 | Cp-145 | Cp-146 | Cp-147 | Cp-148 | Cp-149 | Cp-150 | Cp-151 |
| | Ar | | | | | | |

TABLE 2-continued

| | Cp-104 | Cp-105 | Cp-106 | Cp-107 | Cp-108 |
|---|---|---|---|---|---|
| (structure with CONH—Ar on naphthol with CH₃) | Cp-116 | Cp-117 | Cp-118 | Cp-119 | Cp-120 |
| (structure with CONH—Ar on naphthol linked to N-phenyl) | Cp-128 | Cp-129 | Cp-130 | Cp-131 | Cp-132 |
| (structure with CONH—Ar on anthracene diol with CH₃) | | | | | |

TABLE 2-continued

| | Cp-140 | Cp-141 | Cp-142 | Cp-143 | Cp-144 |
|---|---|---|---|---|---|
| HO—, CONH—Ar, carbazole structure with CH₃ | | | | | |
| | Cp-152 | Cp-153 | Cp-154 | Cp-155 | Cp-156 |
| HO—, CONH—Ar, dibenzofuran structure with CH₃ | | | | | |

TABLE 3

| No. of Cp' | Cp' |
| --- | --- |
| (Cp'-157) | 2-hydroxy-3-methylnaphthalene-1-carboxylic acid hydrazone with 4-chlorobenzophenone |
| (Cp'-158) | 2-hydroxy-3-methylnaphthalene-1-carboxylic acid hydrazone with 3-methylbenzaldehyde |
| (Cp'-159) | 2-hydroxy-3-methylnaphthalene-1-carboxylic acid hydrazone with acetophenone |
| (Cp'-160) | 2-hydroxy-3-methylnaphthalene-1-carboxylic acid hydrazone with phenyl 4-pyridyl ketone |
| (Cp'-161) | 2-hydroxy-3-methylnaphthalene-1-carboxylic acid hydrazone with phenyl 1-naphthyl ketone |

TABLE 3-continued

| No. of Cp' | Cp' |
| --- | --- |
| (Cp'-162) | 2-hydroxy-3-methylnaphthalene-1-carboxylic acid hydrazone with 9-ethyl-3-benzoylcarbazole |
| (Cp'-163) | 2-hydroxy-3-methylnaphthalene-1-carboxylic acid hydrazone with benzophenone |
| (Cp'-164) | 2-hydroxy-3-methylnaphthalene-1-carboxylic acid hydrazone with methoxymethyl phenyl ketone |
| (Cp'-165) | 2-hydroxy-3-methylnaphthalene-1-carboxylic acid hydrazone with chloromethyl phenyl ketone |
| (Cp'-166) | 2-hydroxy-3-methylnaphthalene-1-carboxylic acid hydrazone with 3,5-dimethoxybenzaldehyde |

TABLE 3-continued
| No. of Cp' | Cp' |
|---|---|
| (Cp'-167) |  |
| (Cp'-168) |  |
| (Cp'-169) |  |
| (Cp'-170) |  |
| (Cp'-171) |  |
| (Cp'-172) | 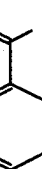 |
| (Cp'-173) |  |
| (Cp'-174) |  |

TABLE 3-continued

| No. of Cp' | Cp' |
|---|---|
| (Cp'-175) | [structure] |
| (Cp'-176) | [structure] |
| (Cp'-177) | [structure] |
| (Cp'-178) | [structure] |
| (Cp'-179) | [structure] |
| (Cp'-180) | [structure] |
| (Cp'-181) | [structure] |
| (Cp'-182) | [structure] |

TABLE 3-continued

| No. of Cp' | Cp' |
|---|---|
| (Cp'-183) | (structure) |
| (Cp'-184) | (structure) |

The synthesis of the novel tetrakisaxo compound of the present inention can be easily accomplished by the following method. Specifically, a tetraamino compound of the general formula (2) is converted to an octaazo compound by an ordinary method. The octaazo compound is then allowed to undergo coupling with a corresponding coupler. Alternatively, an octazonium salt is isolated in the form of a borofluoride or zinc chloride double salt. The salt thus isolated is then allowed to undergo coupling with a coupler in the presence of an alkali in a solvent such as N,N-dimethylformamide and dimethylsulfoxide.

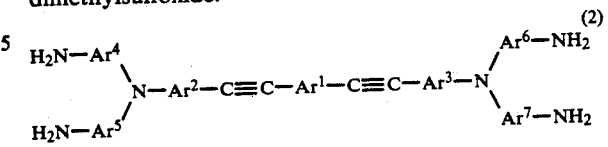

wherein $Ar^1$, $Ar^2$, $Ar^3$, $Ar^4$, $Ar^5$, $Ar^6$ and $Ar^7$ are as defined in the general formula (1).

SYNTHESIS EXAMPLE

Synthesis of a tetrakisazo compound in the compound group (1) wherein teh coupler is (Cp'-21)

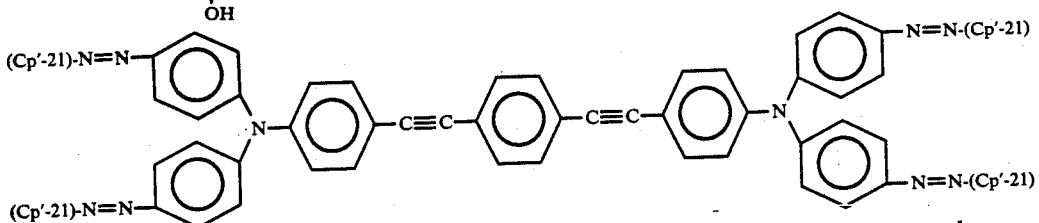

6.72 g (0.01 mol) of a tetraamino compound represented by the structural formula (3) was added to a dilute hydrochloric acid prepared from 25 ml of concentrated hydrochloric acid and 30 ml of water. The mixture was stirred on a water bath at a temperature of 60° C. over about 30 minutes. The mixture was then cooled to 0° C. A solution of 3.04 g of sodium nitrite in 10 ml of water was added dropwise to the mixture at a temperature of 0° C. over about 20 minutes. The mixture was further stirred at the same temperature over 1 hour. A small amount of unreacted matter was then filtered off. The filtrate was then added dropwise to a solution consisting of 15.3 g (0.04 mol) of Coupler (Cp'-21), 3.0 g of sodium acetate, 50 ml of water and 300 ml of DMF with stirring while cooling with ice. The mixture was then stirred at room temperature over 2 hours. The resulting crystals were then filtered off, and washed with water and then with acetone. These crystallization, filtering and washing processes were repeated so that the product was purified. As a result, 15.2 g of a black powder of the desired tetrakisazo compound was obtained. (Yield: 68%; decomposition temperature: 270° C.)

Elementary analysis:
Calculated % for $C_{142}H_{96}N_{18}O_{12}$: C75.92, H4.31, N11.22
Found %: C75.68, H4.53, N11.09

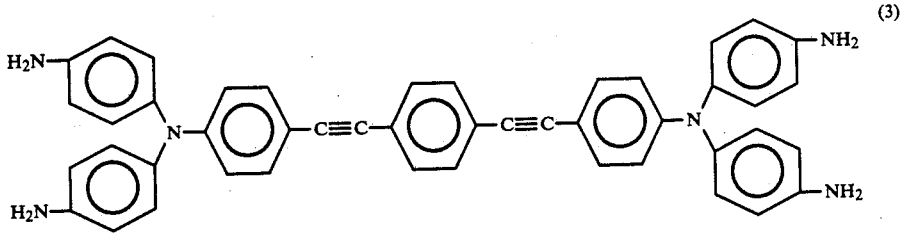

The electrophotographic photoreceptor of the present invention comprises an electrophotographic light-sensitive layer containing one or two tetrakisazo compounds represented by the general formula (1). Various forms of electrophotographic photoreceptors have been known. The electrophotographic photoreceptor of the present invention may be in any of these forms but normally has an electrophotographic photoreceptor structure of any of the following types (I), (II) and (III):

(I) Structure comprising on an electrically conductive support an electrophotographic light-sensitive layer with a tetrakisazo compound dispersed in a binder or charge carrier-transporting medium;

(II) Structure comprising on an electrically conductive support a charge carrier-generating layer containing a tetrakisazo compound as a main component and a charge carrier-transporting layer provided thereon; and (III) Structure comprising on an electrically conductive support a charge carrier-transporting layer and a charge carrier-generating layer containing a tetrakisazo compound as a main component provided thereon.

The tetrakisazo compound of the present invention has an effect of producing a charge carrier at an extremely high efficiency upon absorption of light. The charge carrier thus produced is transported by a charge carrier-transporting compound.

The preparation of an electrophotographic photoreceptor of Type (I) can be accomplished by dispersing finely divided grains of a tetrakisazo compound in a binder solution or a solution containing a charge carrier-transporting compound and a binder solution, coating the dispersion on an electrically conductive support, and then drying the coated material. The thickness of the electrophotographic photoreceptor thus prepared may be in the range of 3 to 30 μm, preferably 5 to 20 μm.

The preparation of an electrophotographic photoreceptor of Type (II) can be accomplished by vacuum-evaporating a tetrakisazo compound on an electrically conductive support to form a charge carrier-generating layer thereon or by dispersing finely divided grains of a tetrakisazo compound in a proper solvent containing a binder resin, coating the dispersion on a support, drying the coated material to form a charge carrier-generating layer thereon, and then optionally finishing the surface of the layer by a properprocess such as buffing or otherwise adjusting the thickness of the film, and thereafter coating a solution containing a charge carrier-transporting substance and a binder resin thereon, and drying the coated material. The thickness of the charge carrier-generating layer thus prepared may be in the range of 0.01 to 4 μm, preferably 0.1 to 2 μm. The thickness of the charge carrier-transporting layer may be in the range of 3 to 30 μm, preferably 5 to 20 μm.

The preparation of an electrophotographic photoreceptor of Type (III) can be accomplished by reversing the order of lamination of the electrophotographic photoreceptor of Type (II).

The tetrakisazo compound to be incorporated in the photoreceptor of Types (I), (II), and (III) is subjected to dispersion in a dispersion apparatus such as ball mill, sand mill and oscillating mill to an average grain diameter of 0.1 to 2 μm, preferably 0.3 to 2 μm before use.

If the amount of the tetrakisazo compound to be incorporated in the electrophotographic photoreceptor of Type (I) is too small, the photoreceptor thus obtained exhibits a poor sensitivity. On the contrary, if the amount of the tetrakisazo compound to be incorporated in the electrophotographic photoreceptor is too large, the photoreceptor thus obtained exhibits a poor chargeability and a poor film strength in the electrophotographic light-sensitive layer. The weight proportion of the tetrakisazo compound in the electrophotographic light-sensitive layer, if a binder is incorporated therein, may be in the range of 0.01 to 2 times, preferably 0.05 to 1 time that of the binder. The weight proportion of the charge carrier-transporting compound may be in the range of 0.1 to 2 times, preferably 0.3 to 1.5 times that of the binder. In the case of a charge carrier-transporting compound which can be used as a binder itself, the amount of the tetrakisazo compound to be incorporated is preferably in the range of 0.01 to 0.5 times that of the charge carrier-transporting compound.

In the case where a tetrakisazo compound-containing layer is coated as a charge carrier-generating compound-containing layer in the preparation of an electrophotographic photoreceptor of Type (II) or (III), the amount if tge tetrajusazi cinoiybd ti be incorporated is preferably in the range of 0.1 or more times that of the binder. If the value is less than this range, a sufficient sensitivity cannot be obtained. Such a tetrakisazo compound can be also used in the absence of a binder. The weight proportion of the charge carrier-transporting compound to be incorporated in the charge carrier-transporting compound-containing layer may be in the range of 0.2 to 2 times, preferably 0.3 to 1.5 times that of the binder. In the case where a high molecular charge carrier-transporting compound which can be used as a binder itself is employed, such a compound can be used in the absence of any other binder.

The tetrakisazo compound of the present invention may be used with a conventional charge carrier-generating compound. Though the mixing ratio is arbitrary, it is preferred to ad 0.1 to 10 parts by weight of conventional charge carrier-generating compound per part by weight of the tetrakisazo compound of the invention.

Examples of an electrically conductive support to be incorporated in the present electrophotographic photoreceptor include plate of metal such as aluminum, copper and zinc, material comprising a sheet or film of plastic such as polyester with an electrically conductive material such as aluminum, indium oxide, tin oxide and copper iodide vacuum-evaporated or dispersion-coated thereon, and paper treated with an inorganic salt such as sodium chloride and calcium chloride or an organic quaternary ammonium salt.

If a binder is uded, as such a binder there may be preferably used a hydrophobic high dielectricity electrical insulating film-forming high molecular polymer. Specific examples of such a high molecular polymer will be set forth below, but the present invention should not be construed as being limited thereto.

Polycarbonate, polyester, polyester carbonate, polysulfone, methacrylic resin, acrylic resin, polyvinyl chloride, polyvinylidene chloride, polystyrene, polyvinyl acetate, styrene-butadiene copolymer, vinylidene chloride-acrylonitrile copolymer, vinyl chloride-vinyl acetate copolymer, vinyl chloride-vinyl acetate-maleic anhydride copolymer, silicone resin, silicone-alkyd resin, phenol-formaldehyde resin, styrene-alkyd resin, styrene-maleic anhydride copolymer, phenoxy resin, polyvinylbutyral resin, and poly-N-vinylcarbazole.

These resin binders can be used singly or in admixture.

In the present photoreceptor, a plasticizer can be used in admixture with a resin binder.

Examples of such a plasticizer which can be used in the present invention include biphenyl, biphenyl chloride, 0-terphenyl, p-terphenyl, dibutyl phthalate, dimethyl glycol phthalate, dioctyl phthalate, triphenylphosphoric acid, chlorinated paraffin, and dilauryl thiodipropionate.

In the preparation of the present electrophotographic photoreceptor, an additive such as a sensitizer may be incorporated in the light-sensitive layer.

Examples of such a sensitizer include a triallymethane dye such as Brilliant Green, Victorian Blue B, Methyl Violet, Crystal Violet and Acid 6B, a xanthene dye such as Rhodamine B, Rhodamine 6G, Rhodamine G Extra, Eosine S, Erythrosine, Rose Bengal and Fluoresceine, a thiazine dye such as Methylene Blue, an astrazone dye such as C. I. Basic, Violet 7 (e.g., C. I. 48020), a cyanine dye, and a pyrilium dye such as 2,6-diphenyl-4-(N,N-dimethylaminophenyl)thiapyrilium perchlorate and benzopyrilium salt (as described in JP-B-48-25658).

In order to improve the surface characteristics of the electrophotographic photoreceptor, a silicone oil, fluorine surface active agent or the like may be used.

The charge carrier-transporting substances to be incorporated in the charge carrier-transporting layer of the present invention can be classified into two kinds of compounds: compounds which transport electrons and compounds which transport positive holes. The electrophotographic photoreceptor of the present invention can comprise either of the two types of compounds.

As such a compound which transports electrons there can be used a compound containing an electron attractive group. Examples of such a compound include 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole, chloranil, 2,3-dichloro-5,6-dicyanobenzoquinone, 2,4,7-trinitro-9,10-phenanthrenequinone, tetrachlorophthalic anhydride, tetracyanoethylene, and tetracyanoquinodimethane.

As such a compound which transports positive holes there can be used a compound containing an electron-donating group.

Examples of such a compound having a high molecular weight include:

(a) Polyvinyl carbazoles and derivatives thereof as described in JP-B-34-10966;

Vinyl polymers as described in JP-B-43-18674 and JP-B-43-19192 such as polyvinyl pyrene, polyvinyl anthracene, poly-2-vinyl-4-(4'-dimethylaminophenyl)-5-phenyloxazole and a poly-3-vinyl-N-ethylcarbazole;

(c) Polymers as described in JP-B-43-19193 such as copolymers of styrene with polyacenaphthylene, polyindene or acenaphthylene;

(d) Condensed resins as described in JP-B-56-13940 such as pyrene-formaldehyde resin, bromopyrene-formaldehyde resin and ethylcarbazole-formaldehyde resin; and (e) Various triphenylmethane polymers as described in JP-A-56-90883 and JP-A-56-161550.

Examples of such a compound having a low molecular weight include:

(f) Triazole derivateves as described in U.S. Pat. No. 3,112,197;

(g) Oxadiazole derivatives as described in U.S. Pat. No. 3,189,447;

(h) Imidazole derivatives as described in JP-B-37-16096;

(i) Polyarylalkane derivatives as described in U.S. Pat. Nos. 3,615,402, 3,820,989 and 3,542,544, JP-B-45-555 and JP-B-51-10983, and JP-A-51-93224, JP-A-55-108667, JP-A-55-156953, and JP-A-56-36656;

(j) Pyrazoline derivatives and pyrazolone derivatives as described in U.S. Pat. Nos. 3,180,729 and 4,278,746, and JP-A-55-88064, JP-A-55-88065, JP-A-49-105537, JP-A-55-51086, JP-A-56-80051, JP-A-56-88141, JP-A-57-45545, JP-A-54-112637, and JP-A-55-74546;

(k) Phenylenediamine derivatives as described in U.S. Pat. Nos. 3,615,404, JP-B-51-10105, JP-B-46-3712 and JP-B-47-28336, and JP-A-54-83435, JP-A-54-110836 and JP-A-54-119925;

(l) Arylamine derivatives as described in U.S. Pat. Nos. 3,567,450, 3,180,703, 3,240,597, 3,658,520, 4,232,103, 4,175,961 and 4,012,376, West German Patent (DAS) 1,110,518, JP-B-49-35702 and JP-B-39-27577, and JP-A-55-144250, JP-A-56-119,132, and JP-A-56-22437;

(m) Amino-substituted chalcone derivatives as described in U.S. Pat. No. 3,526,501;

(n) N,N-bicarbazyl derivatives as described in U.S. Pat. No. 3,542,546;

(o) Oxazole derivatives as described in U.S. Pat. No. 3,257,203;

(p) Styrylanthracene derivatives as described in JP-A-56-46234;

(q) Fluorenone derivatives as described in JP-A-54-110837;

(r) Hydrazone derivatives as described in U.S. Pat. No. 3,717,462, and JP-A-54-59143 (U.S. Pat. No. 4,150,987), JP-A-55-52063, JP-A-55-52064, JP-A-55-46760, JP-A-55-85495, JP-A-57-11350, JP-A-57-148749 and JP-A-57-104144;

(s) Benzidine derivatives as described in U.S. Pat. Nos. 4,047,948, 4,047,949, 4,265,990, 4,273,846, 4,299,897 and 4,306,008; and (t) Stilbene derivatives as described in JP-A-58-190953, JP-A-59-95540, JP-A-59-97148, JP-A-59-195658 and JP-A-62-36674.

In the present invention, the charge carrier-transporting compounds should not be construed as being limited to those belonging to the compound groups (a) to (t). All charge carrier-transporting compounds which have heretofore been known can be used.

In the preparation of the present electrophotographic photoreceptor, an additive such as a sensitizer may be incorporated in the charge-generating layer and charge-transporting layer. Alternatively, a charge-transporting compound may be incorporated in the charge-generating layer.

Examples of such a sensitizer include chloranil, tetracyanoethylene, Methyl Violet, Rhodamine B, cyanine dye, melocyanine dye, pyrilium dye, and thiapyrilium.

In the present electrophotographic photoreceptor, an adhesive layer or barrier layer can be optionally provided between the electrically conductive support and the light-sensitive layer. As examples of materials to be incorporated in these layers there can be used polymers which can be as the above described binder. Otherexamples of materials to be incorporated in these layers include gelatin, casein, polyvinyl alcohol, ethyl cellulose, carboxymethyl cellulose, vinylidene chloride polymer latexes as described in JP-A-59-84247, styrene-butadiene polymer latexes as described in JP-A-59-114544, and aluminum oxide. The thickness of these layers is preferably in the range of 1 μm or less.

The electrophotographic photoreceptor thus obtained can be treated properly so as to protect itself fron an interfering light produced when an interfering light suchas laser is used for exposure. There have been proposed many such treatment methods. For example, JP-A-60-186850 proposes the provision of an undercoating layer having a light scattering surface. JP-A-60-184258 proposes the provision of a titanium black-containing undercoating layer. JP-A-58-82249 proposes the absorpotion of a major part of light to be used in a charge carrier-generating layer. JP-A-61-18963 proposes that a charge carrier-transporting layer have a microphase separating structure. JP-A-60-86550 proposes the incorporation of a substance which absorbs or scatters an interfering light in a photoconductive layer. JP-A-63-106757 proposes the provision of an identation having a depth of one-fourth of the wavelength of an interfering light on the surface of a light-sensitive material. JP-A-62-172371 and JP-A-62-174771 propose the provision of a light-scattering layer or light-absorbing layer ont he back surface of a transparent support.

The present electrophotographic photoreceptor has been described in detail. The present electrophotographic photoreceptor generally exhibits a high sensitivity and a small change in electrophotographic properties after repeated use.

The present electrophotographic photoreceptor can be widely used in electrophotographic copying machines as well as in the field of light-sensitive materials for printers using laser, CRT, LED or the like as the light source.

A photoconductive composition containing the present tetrakisazo compound can be used as a photoconductive layer in the pickup tube for a video camera or as a photoconductive layer having a light-receiving layer (photoconductive layer) in a solid-state imaging device provided on the entire surface of a one-dimensionally or two-dimensionally arranged semiconductor circuit for signal transfer or scanning. As described in A. K. Ghosh, Tom Geng, *J. Appl. Phys.*, 49 (12), 6982 (1978), such as a photoconductive composition can also be used as a photoconductive layer for a solar cell.

The present tetrakisazo compound can further be used as photoconductive colored grains in a photoelectrophoresis system or as colored grains of a dry or wet process electrophotographic developer.

As disclosed in JP-A-37-17162, and JP-A-55-19063, JP-A-55-161250 and JP-A-57-147656, a high resolution, durability and sensitivity printing plate and printed circuit can be prepared by dispersing the present tetrakisazo compound in an alkali-soluble resin such as phenol resin together with the above described electric charge carrier-transporting compound such as an oxadiazole derivative and a hydrazone derivative, coating the dispersion on an electrically conductive support such as aluminum, drying the coated material, imagewise exposing the material to light, subjecting the material to toner development, and then etching the material with an aqueous solution of an alkali.

The present invention will be further described in the following examples, but the present invention should not be construed as being limited thereto.

EXAMPLE 1

5 parts by weight fo a tetrakisazo compound belonging to Compoudn Group No. 1 wherein Cp' is (Cp-21) and 5 parts by weight of a polyester resin (Vylon; Toyobo Co., Ltd.) were added to 50 parts by weight of tetrahydrofuran. The mixture was then subjected to dispersion in a ball mill over 12 hours. The dispersion was then coated on an electrically conductive support (75-μm polyethyleneterephthalate support comprising an aluminum-deposited film thereon) by means of a wire round rod, and dried to obtain a charge-generating layer having a thickness of bout 0.5 μm.

A solution obtained by mixing 3.6 parts by weight of p-(diphenylamino)benzaldehyde-N'-methyl-N'-phenyl-hydrazone of the general formula:

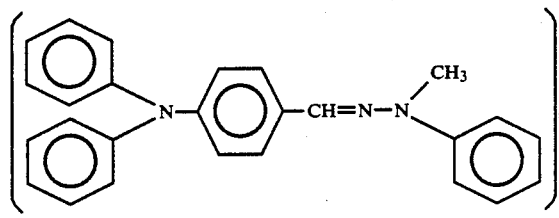

4 parts by weight of a polycarbonate resin (Panlite K-1300: Teijin Limited), 13.3 parts by weight of dichloromethane and 26.6 parts by weight of 1,2-dichloroethane was coated on the charge-generating layer by means of an applicator to form a charge-transporting layer thereon. Thus, an electrophotographic photoreceptor comprising a light-sensitive layer consisting of two layers was prepared.

The electrophotographic photoreceptor thus prepared was then evaluated for electrophotographic properties in a static process by means of a static copying paper tester (Kawaguchi Denki Seisakusho K. K.'s Model SP-428). Specifically, the photoreceptor was first measured for initial surface potential Vs developed shortly after being corona-charged and surface potential Vo left after being stored in a dark place for 30 seconds. The photoreceptor was then exposed to light from a tungsten lamp in such a manner that the illuminance on the surface of the photoreceptor reached 3 lux. The photoreceptor were then measured for exposure $E_{50}$ such that the surface potential before exposure is attenuated to half the initial surface potential Vo and surface potential left 30 seconds after exposure (residual potential $V_R$). This measurement process was repeated 3,000 times. The results are set forth in Table 4.

TABLE 4

|  | $E_{50}$ (Lux · sec) | Vs (−V) | Vo (−V) | $V_R$ (−V) |
|---|---|---|---|---|
| 1st time | 1.3 | 950 | 860 | 0 |
| 3000th time | 1.3 | 930 | 840 | 1 |

EXAMPLES 2 TO 15

Two-layer electrophotographic photoreceptors were prepared in the same manner as in Example 1 except that the tetrakisazo compound was replaced by those set forth in Table 5. These specimens were then measured for $E_{50}$, Vs, Vo and $V_R$ in the same manner as in Example 1. The results are set forth in Table 5.

TABLE 5

| Example No. | Tetrakisazo Compound Compound Group No. | Cp' No. | 1st Time $E_{50}$ (Lux · Sec) | Vs (−V) | Vo (−V) | $V_R$ (−V) | 3000th Time $E_{50}$ (Lux · Sec) | Vs (−V) | Vo (−V) | $V_R$ (−V) |
|---|---|---|---|---|---|---|---|---|---|---|
| 2 | (1) | (Cp'-1) | 1.2 | 930 | 850 | 0 | 1.2 | 920 | 840 | 0 |

TABLE 5-continued

| Example No. | Tetrakisazo Compound Compound Group No. | Compound Cp' No. | 1st Time E50 (Lux·Sec) | Vs (−V) | Vo (−V) | VR (−V) | 3000th Time E50 (Lux·Sec) | Vs (−V) | Vo (−V) | VR (−V) |
|---|---|---|---|---|---|---|---|---|---|---|
| 3 | (1) | (Cp'-8) | 1.3 | 950 | 870 | 0 | 1.4 | 930 | 840 | 1 |
| 4 | (1) | (Cp'-22) | 1.1 | 930 | 860 | 0 | 1.1 | 900 | 835 | 0 |
| 5 | (1) | (Cp'-41) | 1.2 | 960 | 880 | 0 | 1.2 | 910 | 840 | 1 |
| 6 | (1) | (Cp'-50) | 1.0 | 950 | 850 | 0 | 1.0 | 900 | 810 | 1 |
| 7 | (4) | (Cp'-2) | 1.3 | 940 | 880 | 0 | 1.3 | 880 | 810 | 2 |
| 8 | (4) | (Cp'-21) | 1.2 | 920 | 830 | 0 | 1.2 | 900 | 805 | 0 |
| 9 | (4) | (Cp'-51) | 1.3 | 940 | 870 | 0 | 1.4 | 890 | 830 | 2 |
| 10 | (6) | (Cp'-3) | 1.4 | 960 | 890 | 0 | 1.4 | 900 | 820 | 0 |
| 11 | (6) | (Cp'-22) | 1.5 | 930 | 830 | 0 | 1.5 | 890 | 800 | 0 |
| 12 | (7) | (Cp'-5) | 1.2 | 990 | 870 | 0 | 1.2 | 920 | 810 | 0 |
| 13 | (10) | (Cp'-1) | 1.5 | 930 | 810 | 0 | 1.6 | 890 | 780 | 1 |
| 14 | (12) | (Cp'-21) | 1.1 | 940 | 830 | 0 | 1.1 | 890 | 780 | 0 |
| 15 | (12) | (Cp'-51) | 1.2 | 940 | 820 | 0 | 1.2 | 900 | 790 | 0 |
| 16 | (13) | (Cp'-21) | 1.3 | 890 | 810 | 0 | 1.3 | 830 | 770 | 0 |
| 17 | (14) | (Cp'-22) | 1.4 | 920 | 805 | 0 | 1.5 | 890 | 790 | 1 |
| 18 | (14) | (Cp'-50) | 1.5 | 930 | 840 | 0 | 1.6 | 880 | 800 | 2 |
| 19 | (15) | (Cp'-7) | 2.0 | 940 | 820 | 0 | 2.0 | 890 | 790 | 1 |
| 20 | (16) | (Cp'-12) | 1.7 | 980 | 870 | 0 | 1.7 | 910 | 810 | 0 |
| 21 | (17) | (Cp'-53) | 2.1 | 930 | 800 | 0 | 2.1 | 880 | 760 | 0 |
| 22 | (19) | (Cp'-25) | 1.6 | 990 | 840 | 0 | 1.6 | 920 | 860 | 0 |
| 23 | (22) | (Cp'-21) | 1.7 | 920 | 820 | 0 | 1.7 | 880 | 805 | 0 |
| 24 | (24) | (Cp'-22) | 1.5 | 900 | 810 | 0 | 1.5 | 850 | 770 | 0 |
| 25 | (24) | (Cp'-167) | 1.3 | 950 | 870 | 0 | 1.3 | 890 | 800 | 0 |

EXAMPLE 26

5 parts by weight of a tetrakisazo compound belonging to Compound Group No. (1) wherein Cp' is (Cp'-21), 40 parts by weight of the same hydrazone compound as used in Example 1 and 100 parts of a copolymer of benzyl methacrylate and methacrylic acid ([η] 30° C. in methyl ethylketone: 0.12; methacrylic acid content: 32.9%) were added to 660 parts by weight of dichloromethane. The mixture was then subjected to dispersion in a ball mill over 12 hours. The dispersion was then coated on a 0.25 mm thick grained aluminum plate, and dried to prepare an electrophotographic printing plate material comprising a 6 μm thick electrophotographic light-sensitive layer.

The specimen was then subjected to corona discharge at +6 KV in a dark place so that the light sensitive layer was charged at a surface potential of +500 V. The specimen was then exposed to light from a tungsten lamp with a color temperature of 2,854° K. in such a manner that the illuminance on the surface of the specimen reached 2.0 lux. As a result, the specimen exhibited a half reduction exposure E50 of 2.0 lux sec.

The specimen was then charged at a surface potential of +500 V in a dark place. The specimen was then imagewise exposed to light with a transparent original of positive image brought into close contact thereto. The specimen was then immersed in a liquid developer comprising 1 l of Isoper H (petroleum solvent produced by Esso Standard Co.), 5 g of finely dispersed polymethyl methacrylate (toner) and 0.01 g of soybean oil lecithin. As a result, a sharp positive toner image can be obtained.

The specimen was then heated to a temperature of 100° C. over 30 seconds to fix the toner image. The printing plate material was immersed in an etching solution obtained by dissolving 70 g of sodium metasilicate hydride in 140 ml of glycerin, 550 ml of ethylene glycol and 150 ml of ethanol over 1 minute. The printing plate material was washed in a water flow with light brushing to remove the light-sensitive layer on the portion free of the toner. Thus, the desired printing plate was obtained.

The printing plate thus prepared was then used for printing by means of Hamada Star 600 CD Offset Printer. As a result, 50,000 sheets of extremely sharp printed matters free of any stain on the background were obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising on an electrically conductive support a layer containing a charge-transporting compound and a charge-generating compound or a charge-transporting compound-containing layer and a charge-generating compound-containing layer, wherein said charge-generating compound is a tetrakisazo compound represented by the general formula (1):

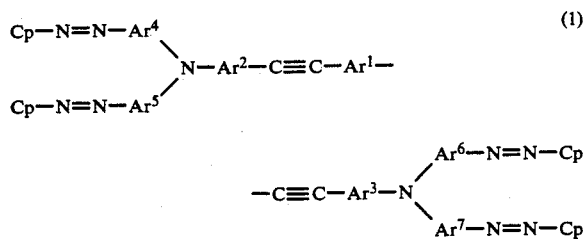

wherein $Ar^1$, $Ar^2$, $Ar^3$, $Ar^4$, $Ar^5$, $Ar^6$ and $Ar^7$ each represents an arylene group, divalent condensed polycyclic aromatic group or divalent heterocyclic aromatic group; and Cp represents a coupler residue.

2. An electrophotographic photoreceptor as in claim 1, wherein $Ar^1$, $Ar^2$, $Ar^3$, $Ar^4$, $Ar^5$, $Ar^6$ and $Ar^7$ are selected from the group consisting of phenylene, naphthalene, antolylene, biphenylene, terphenylene, indene, fluorene, acenaphthene, perylene, fluorenone, anthrone, anthraquinone, benzoanthrone isocoumarin, pyridine, quinoline, oxazol, thiazole, oxadiazole, benzooxazole, benzoimidazole, benzothiazole, benzotriazole, dibenzofurane, carbazole, and xanthene, each of which may be substituted by one or more substituents selected from the group consisting of $C_{1-18}$ alkyl groups, $C_{1-18}$ alkoxy groups, dialkylamino groups containing two $C_{1-18}$ alkyl groups, $C_{1-18}$ acyl groups, $C_{1-8}$ acyloxy groups, $C_{1-18}$ amide groups, $C_{6-15}$ aryl groups, $C_{6-15}$ aryloxy groups, halogen atoms, hydroxy groups, carboxyl groups, nitro groups, cyano groups, and trifluoromethyl groups.

3. An electrophotographic photoreceptor as in claim 1, wherein Cp represents:

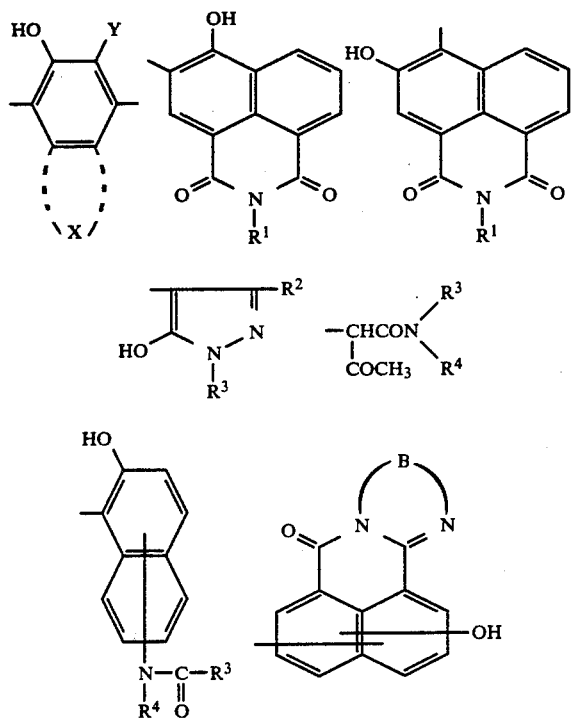

wherein X represents an atomic group which is required to be condensed with the benzene ring to which a hydroxy group and Y are bonded to form an aromatic group or a heterocyclic group;

Y represents —$CONR^3R^4$, —$CONHN=CR^3R^4$ or —$COOR^3$;

$R^1$ represents a $C_{1-12}$ alkyl or a $C_{6-14}$ aryl group;

$R^2$ represents an alkyl group, carbamoyl group, carboxyl group, alkoxycarbonyl group, aryloxycarbonyl group, or a substituted or unsubstituted amino group;

$R^3$ represents an alkyl group, aromatic carbon ring group, or aromatic heterocyclic group, each of which may be substituted;

$R^4$ represents a hydrogen atom or has the same meaning as $R^3$; and

B represents an divalent aromatic hydrocarbon group or a divalent aromatic heterocyclic group, each of which may be substituted.

4. An electrophotographic photoreceptor as in claim 3, wherein when X is an aromatic group or heterocyclic group containing substituents, the substituents are selected from the group consisting of a halogen atom, $C_{1-18}$ alkyl groups, a trifluoromethyl group, a nitro group, an aminO group, a cyano group, and $C_{1-18}$ alkoxy groups, wherein one or more of such substituents may be placed on any position.

5. An electrophotographic photoreceptor as in claim 3, wherein
said substituents for said substituted alkyl groups are selected from the group consisting of a hydroxy group, $C_{1-12}$ alkoxy groups, a cyano group, amino groups, $C_{1-12}$ alkylamino groups, dialkyl groups containing two $C_{1-12}$ alkyl groups, halogen atoms, and $C_{6-15}$ aryl groups, and
said substituents for said substituted aryl group are selected from the group consisting of a hydroxy group, $C_{1-12}$ alkoxy groups, a cyano group, amino groups, $C_{1-12}$ alkylamino groups, dialkyl groups containing two alkyl groups, halogen atoms, $C_{1-12}$ alkyl groups, a nitrO group, and a trifluoromethyl group.

6. An electrophotographic photoreceptor as in claim 3, wherein $R^2$ is selected from the group consisting of $C_{1-16}$ lower alkyl groups, a carbamoyl group, a carboxyl group, alkOxycarbonyl groups containing $C_{1-12}$ alkoxy groups, aryloxycarbonyl groups containing $C_{6-20}$ aryloxy groups, and substituted or unsubstituted amino groups.

7. An electrophotographic photoreceptor as in claim 3, wherein $R^3$ is selected from the group consisting of $C_{1-20}$ alkyl groups, aromatic carbon ring groups, aromatic heterocyclic groups, and substituted groups thereof, wherein if $R^3$ is a substituted alkyl group, substituents are those described with reference to $R^1$, if $R^3$ is an aromatic carbon ring group containing substituents, the substituents are selected from the group consisting of a hydroxy group, cyano group, nitro group, halogen atoms, $C_{1-12}$ alkyl groups, $C_{1-12}$ alkoxy groups, amino groups, $C_{1-12}$ alkylamino groups, $C_{1-12}$ dialkylamino groups, $C_{6-12}$ arylamino groups, diarylamino groups containing two $C_{6-15}$ aryl groups, a carboxyl group, alkaline metal carboxylate groups, alkaline metal sulfonate groups, alkylcarbonyl groups, arylcarbonyl groups containing $C_{6-12}$ aryl groups, $C_{1-12}$ alkylthio groups, and $C_{1-12}$ arylthio groups, wherein the number of these substituents which can be contained in the substituted aromatic carbon ring group is in the range of 1 to 5, wherein if a plurality of these substituents are contained in the substituted aromatic carbon ring group, they may be the same or different, and wherein the position on which these substituents can be placed is arbitrary.

8. An electrophotographic photoreceptor as in claim 1, comprising on an electrically conductive support an electrophotographic light-sensitive layer with a tetrakisazo compound dispersed in a binder or charge carrier-transporting medium.

9. An electrophotographic photoreceptor as in claim 1, comprising on an electrically conductive support a charge carrier-generating layer containing a tetrakisazo compound as a main component and a charge carrier-transporting layer provided thereon.

10. An electrophotographic photoreceptor as in claim 1, comprising on an electrically conductive support a charge carrier-transporting layer and charge carrier-generating layer containing a tetrakisazo compound as a main component provided thereon.

* * * * *